United States Patent
Chae

(10) Patent No.: US 11,183,190 B2
(45) Date of Patent: Nov. 23, 2021

(54) METHOD AND APPARATUS FOR RECOGNIZING A VOICE

(71) Applicant: LG ELECTRONICS INC., Seoul (KR)

(72) Inventor: Jong Hoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 141 days.

(21) Appl. No.: 16/571,018

(22) Filed: Sep. 13, 2019

(65) Prior Publication Data
US 2020/0013407 A1    Jan. 9, 2020

(30) Foreign Application Priority Data

May 21, 2019    (KR) .................. 10-2019-0059389

(51) Int. Cl.
*G06F 40/20* (2020.01)
*G10L 15/08* (2006.01)
(Continued)

(52) U.S. Cl.
CPC ............ *G10L 15/22* (2013.01); *G06F 40/205* (2020.01); *G06F 40/253* (2020.01);
(Continued)

(58) Field of Classification Search
None
See application file for complete search history.

(56) References Cited

U.S. PATENT DOCUMENTS 9,922,642 B2 *  3/2018  Pitschel ................ G10L 15/063
10,152,966 B1 * 12/2018  O'Malley ............... G10L 15/22
(Continued)

FOREIGN PATENT DOCUMENTS

JP       2018194844       12/2018
KR    1020090123396     12/2009
(Continued)

OTHER PUBLICATIONS

Korean Intellectual Property Office Application No. 10-2019-0059389, Office Action dated Jun. 9, 2020, 5 pages.
Korean Intellectual Property Office Application No. 10-2019-0059389, Notice of Allowance dated Dec. 7, 2020, 2 pages.

*Primary Examiner* — Richard Z Zhu
(74) *Attorney, Agent, or Firm* — Lee, Hong, Degerman, Kang & Waimey PC

(57) ABSTRACT

Disclosed are a speech recognition method and a speech recognition device, in which speech recognition is performed by executing an artificial intelligence (AI) algorithm and/or a machine learning algorithm provided therein. According to one embodiment, the speech recognition method includes buffering a spoken utterance, extracting a standby wake-up word corresponding to a preset wake-up word from the spoken utterance by comparing the buffered spoken utterance to the preset wake-up word, analyzing the role of the standby wake-up word in the spoken utterance, determining the speech intent in uttering the standby wake-up word by using results of analyzing the role of the standby wake-up word, and determining whether to execute a spoken sentence as a voice command in the spoken utterance and processing the spoken sentence accordingly.

13 Claims, 5 Drawing Sheets

(51) Int. Cl.
  *G10L 15/22* (2006.01)
  *G10L 15/18* (2013.01)
  *G06F 40/205* (2020.01)
  *G06F 40/253* (2020.01)
  *G06F 40/268* (2020.01)
  *G06F 40/295* (2020.01)
  *G10L 25/78* (2013.01)
  *G06F 40/30* (2020.01)

(52) U.S. Cl.
  CPC .......... *G06F 40/268* (2020.01); *G06F 40/295* (2020.01); *G10L 15/08* (2013.01); *G10L 15/1815* (2013.01); *G10L 15/1822* (2013.01); *G06F 40/30* (2020.01); *G10L 25/78* (2013.01); *G10L 2015/088* (2013.01); *G10L 2015/223* (2013.01)

(56) References Cited

U.S. PATENT DOCUMENTS

| | | | |
|---|---|---|---|
| 10,204,624 B1* | 2/2019 | Knudson | G10L 15/22 |
| 10,304,440 B1* | 5/2019 | Panchapagesan | G10L 15/16 |
| 10,468,026 B1* | 11/2019 | Newman | G10L 15/04 |
| 10,649,727 B1* | 5/2020 | Douglas | G06F 3/167 |
| 2014/0214429 A1* | 7/2014 | Pantel | G10L 15/32 |
| | | | 704/275 |
| 2017/0046124 A1* | 2/2017 | Nostrant | G10L 15/16 |
| 2019/0043503 A1* | 2/2019 | Bauer | G10L 15/02 |
| 2020/0279561 A1* | 9/2020 | Sheeder | G06F 3/013 |
| 2020/0342866 A1* | 10/2020 | Casado | G10L 15/1815 |

FOREIGN PATENT DOCUMENTS

| | | |
|---|---|---|
| KR | 1020160064258 | 6/2016 |
| KR | 1020180069660 | 6/2018 |

\* cited by examiner

METHOD AND APPARATUS FOR RECOGNIZING A VOICE

CROSS-REFERENCE TO RELATED APPLICATION

Pursuant to 35 U.S.C. § 119 (a), this application claims the benefit of earlier filing date and right of priority to Korean Patent Application No. 10-2019-0059389, filed on May 21, 2019, the contents of which are all hereby incorporated by reference herein in its entirety.

BACKGROUND

1. Technical Field

The present disclosure relates to a speech recognition method and a speech recognition device, and more specifically, to a speech recognition method and a speech recognition device, which buffer a spoken utterance containing a pause shorter than a preset duration and determine user's speech intent in uttering a wake-up word contained in the buffered spoken utterance to process a spoken sentence.

2. Description of Related Art

As technology continues to advanced, various services using a speech recognition technology have been introduced into numerous fields. Such a speech recognition technology can be understood as a series of processes for understanding an utterance spoken by a person and converting the spoken utterance to textual information manageable by a computer. Likewise, speech recognition services using such a speech recognition technology may include a series of processes for recognizing user's speech and providing an appropriate service corresponding to the speech.

In a speech recognition device using the speech recognition technology described above, speech recognition starts only when a designated command is inputted. Such a command initiating the speech recognition may be referred to as a wake-up word, and features relevant to wake-up word recognition, since they typically pose a relatively low computational load, may be always running in the background in the speech recognition device. More specifically, the wake-up word is a word preregistered in the speech recognition device, the word which, when present in the user's spoken utterance, can be recognized by the speech recognition device and enables the speech recognition device to perform a designated task according to a subsequently inputted voice command.

In this context, Related Art 1 and Related Art 2 disclose a technology in which an electronic device recognizes user's speech signals, and executes a speech recognition operation if the recognized speech signals correspond to a preset keyword (wake-up word), the electronic device.

In particular, Related Art 1 describes a case in which the pause between a wake-up word and a spoken sentence as a voice command is longer than a preset duration, thus producing clear boundaries between the wake-up word and the spoken sentence; however, in this case, if the pause between the wake-up word and the spoken sentence is shorter than a preset duration, producing unclear boundaries between the wake-up word and the spoken sentence, wake-up word recognition and/or spoken sentence analysis would not be accurately executed.

Related Art 2 discloses a method for processing a spoken sentence when the spoken sentence continues after the wake-up word; however, since speech recognition is initiated only after the wake-up word is recognized, spoken sentences that precede the wake-up word would not be recognized by this method.

The background art described above may be technical information retained by the present inventors in order to derive the present disclosure or acquired by the present inventors along the process of deriving the present disclosure, and thus is not necessarily a known art disclosed to the general public before the filing of the present application.

RELATED ART DOCUMENTS

Patent Documents

Related Art 1: Korean Patent Laid-Open Publications No. 10-2016-0064258 (Jun. 8, 2016)

Related Art 2: Korean Patent Laid-Open Publications No. 10-2009-0123396 (Dec. 2, 2009)

SUMMARY OF THE INVENTION

One aspect described in the present disclosure is to address the shortcoming associated with the related art in which wake-up word recognition and/or spoken sentence analysis are not accurately executed due to unclear boundaries between the wake-up word and a spoken sentence when a pause between the wake-up word and the spoken sentence lasts for less than a preset duration.

Another aspect described in the present disclosure is to address the shortcoming of the related art in which a spoken sentence in the user's spoken utterance is not recognized when the wake-up word is positioned after the spoken sentence.

Another aspect described in the present disclosure is to address the shortcoming associated with the related art in which a spoken sentence in the user's spoken utterance is not recognized when the wake-up word is positioned within the spoken sentence.

Another aspect described in the present disclosure is to address the shortcoming associated with the related art in which spoken sentences preceding the wake-up word in the user's spoken utterance are not recognized when the wake-up word is positioned between the spoken sentences.

Another aspect described in the present disclosure is to address, by using optimal processor resources, the shortcoming associated with the related art in which wake-up word recognition and/or spoken sentence analysis are not accurately executed due to unclear boundaries between the wake-up word and the spoken sentence.

Another aspect of the present disclosure is to address, by using optimal processor resources, the shortcoming associated with the related art in which when the wake-up word comes after a spoken sentence intended as a voice command, the voice command is not recognized.

In addition, there may be further provided another method for realizing the present disclosure, another system for realizing the present disclosure, and a computer program for performing the method.

A speech recognition method according to an embodiment of the present disclosure may include temporarily storing a predetermined section of an utterance, and by analyzing the role of a standby wake-up word in the utterance that corresponds to or contains a preset wake-up word, determining the speech intent in uttering the standby wake-up word and executing a voice command.

More specifically, a speech recognition method according to an embodiment of the present disclosure includes: buffering a spoken utterance; extracting a standby wake-up word from the buffered spoken utterance by comparing the buffered spoken utterance to a preset wake-up word, the standby wake-up word corresponding to the preset wake-up word; analyzing the role of the standby wake-up word in the spoken utterance; determining a speech intent in uttering the standby wake-up word by using the results of analyzing the role of the standby wake-up word; and determining whether to execute a spoken sentence as a voice command in the spoken utterance, according to the results of determining a speech intent in uttering the standby wake-up word, and processing the spoken sentence accordingly.

There are several shortcomings with existing speech recognition processing in the related art in which when the wake-up word and a spoken sentence as a voice command continue without a pause therebetween, wake-up word recognition and/or spoken sentence are not accurately executed due to unclear boundaries between the wake-up word and the spoken sentence; however, the speech recognition method according to the present embodiment accurately can execute wake-up word recognition and/or spoken sentence analysis even when the wake-up word and the spoken sentence as a voice command continue with no pause therebetween, thereby producing improvements in speech recognition processing performance.

In addition, the buffering may include buffering the spoken utterance containing a pause shorter than a preset duration between the standby wake-up word and the spoken sentence.

Through the buffering according to the present embodiment, a spoken utterance can be obtained which is capable of addressing the issue in the related art of being unable to accurately execute wake-up word recognition and/or spoken utterance analysis due to unclear boundaries between the wake-up word and the spoken sentence.

In addition, the buffering may further include buffering the spoken utterance by varying a buffering volume or time in accordance with a condition under which the spoken utterance is inputted.

Through the buffering according to the present embodiment, a spoken utterance for executing accurate speech recognition may be obtained by varying the buffering volume or time for buffering the spoken utterance in accordance with a condition under which the spoken utterance is inputted, the condition including a time at which the spoken utterance is inputted, a place at which the spoken utterance is inputted, a pitch of the spoken utterance, accuracy of the spoken utterance, gender of the speaker of the spoken utterance, speed of the spoken utterance, and so forth.

In addition, the analyzing may include analyzing the role of the standby wake-up word on the basis of a natural-language processing algorithm that performs, on the spoken utterance, one or more selected from among morphological segmentation, part-of-speech tagging, sentence breaking, parsing, and named-entity recognition.

Through the analyzing according to the present embodiment, corresponding to the characteristics of natural language which can be uttered in various forms while conveying the same meaning in a sentence, the properties of the standby wake-up word, such as syntactic category, meaning, syntactic role, etc., may be accurately discovered.

In addition, determining the speech intent in uttering the standby wake-up word may include determining that the standby wake-up word is uttered as a deliberate wake-up word in the spoken utterance, or that the standby wake-up word is uttered as an inadvertent wake-up word in the spoken utterance.

Through the determining according to the present embodiment, the speech intent in uttering the standby wake-up word within the spoken utterance, corresponding to the role of the standby wake-up word, may be accurately determined.

In addition, the processing may include activating a speech recognition function and executing the spoken sentence if the standby wake-up word is uttered as the deliberate wake-up word, and causing the speech recognition function to remain inactive if the standby wake-up word is uttered as the inadvertent wake-up word.

In addition, the speech recognition device, in spite of being a mass-produced uniform product, allows a user to perceive the speech recognition device as a personalized device, thus creating the effects of being a user-customized product.

In addition, if the results of determining the speech intent in uttering the standby wake-up word indicate that the standby wake-up word is uttered as a deliberate wake-up word, the speech recognition method according to an embodiment may further include isolating a spoken sentence without the deliberate wake-up word from the spoken utterance, wherein the isolating may include at least one selected from: isolating, from the spoken utterance, the spoken sentence preceding the deliberate wake-up word; isolating, from the spoken utterance, the spoken sentence following the deliberate wake-up word; isolating, from the spoken utterance, first and second spoken segments without the deliberate wake-up word positioned within the spoken sentence, the first spoken segment preceding the deliberate wake-up word and the second spoken segment following the deliberate wake-up word; and isolating, from the spoken utterance containing two or more spoken sentences, the two or more spoken sentences without the deliberate wake-up word positioned between the two or more spoken sentences.

Through the isolating according to the present embodiment, if the spoken sentence contains the wake-up word, the speech recognition function for recognizing the content of a voice command is activated; irrespective of the position of a spoken sentence, the spoken sentence as a voice command without the wake-up word is isolated from the spoken utterance; and the result of processing the spoken sentence is outputted, thus improving the speech recognition processing performance.

A speech recognition device according to an embodiment of the present disclosure includes: a buffer configured to buffer the spoken utterance; an extractor configured to extract, from the spoken utterance, a standby wake-up word corresponding to a preset wake-up word by comparing the buffered spoken utterance to the preset wake-up word; an analyzer configured to analyze a role of the standby wake-up word within the spoken utterance; a determiner configured to determine a speech intent in uttering the standby wake-up word by using results of analyzing the role of the standby wake-up word; and a controller configured to determine, by using results of determining the speech intent in uttering the standby wake-up word, whether to execute a spoken sentence as a voice command in the spoken utterance, and configured to control processing of the spoken sentence.

The speech recognition device according to the present embodiment may improve speech recognition processing performance by accurately executing wake-up recognition and/or spoken utterance analysis even when the wake-up word and the spoken sentence as a voice command continue without a pause therebetween.

In addition, the buffer may buffer a spoken utterance containing a pause shorter than a preset duration between a standby wake-up word and a spoken sentence.

The buffering according to the present embodiment may obtain a spoken utterance capable of addressing the issue in the related art being unable to accurately execute wake-up word recognition and/or spoken utterance analysis due to unclear boundaries between the wake-up word and the spoken sentence.

In addition, the speech recognition device according to the present embodiment may further include a variator configured to vary a buffering volume or time of the buffer in accordance with a condition under which the spoken utterance is inputted.

The variator according to the present embodiment may obtain a spoken utterance for executing accurate speech recognition by varying the buffering volume or time for buffering the spoken utterance in accordance with a condition under which the spoken utterance is inputted, the condition including a time at which the spoken utterance is inputted, a place at which the spoken utterance is inputted, a pitch of the spoken utterance, accuracy of the spoken utterance, gender of the speaker of the spoken utterance, speed of the spoken utterance, and so forth.

In addition, an analyzer 155 may analyze the role of the standby wake-up word on the basis of named-entity recognition (NER) and/or natural-language processing (NLP) which performs, on the spoken utterance, at least one selected from among morphological segmentation, part-of-speech tagging, sentence breaking, and parsing.

The analyzer according to the present embodiment may accurately discover the properties of the standby wake-up word, such as syntactic category, meaning, syntactic role, etc., corresponding to the characteristics of natural language which can be uttered in various forms while conveying the same meaning in a sentence.

In addition, the determiner may determine, by using the results of analyzing the role of the standby wake-up word, whether the standby wake-up word is uttered as a deliberate wake-up word or an inadvertent wake-up word within a given spoken utterance.

The determiner according to the present embodiment may accurately determine the speech intent in uttering the standby wake-up word within the spoken utterance, corresponding to the role of the standby wake-up word, may be accurately determined.

In addition, the controller may activate the speech recognition function and execute the spoken sentence if the standby wake-up word is uttered as the deliberate wake-up word, or may cause the speech recognition function to remain inactive if the standby wake-up word is uttered as the inadvertent wake-up word.

Although the speech recognition device is a mass-produced uniform product, the controller according to the present embodiment may allow the user to perceive the speech recognition device as a personalized device, thus creating the effects of a user-customized product.

In addition, the speech recognition device according to the present embodiment may further include an isolator configured to isolate a spoken sentence without the deliberate wake-up word from the spoken utterance if the results of determining the speech intent in uttering the standby wake-up word indicate that the standby wake-up word is uttered as a deliberate wake-up word, and the isolator may: isolate, from the spoken utterance, the spoken sentence preceding the deliberate wake-up word; isolate, from the spoken utterance, the spoken sentence following the deliberate wake-up word; isolate, from the spoken utterance, first and second spoken segments without the wake-up word positioned within the spoken sentence, the first spoken segment preceding the wake-up word and the second spoken segment following the wake-up word; and isolate, from the spoken utterance containing two or more spoken sentences, the two or more spoken sentences without the deliberate wake-up word positioned between the two or more spoken sentences.

If the spoken sentence contains the wake-up word, the isolator according to the present embodiment may activate the speech recognition function for recognizing the content of a voice command; irrespective of the position of a spoken sentence, isolates the spoken sentence as a voice command from the spoken utterance; and outputs the result of processing the spoken sentence, thus improving the speech recognition processing performance.

According to the present disclosure, wake-up word recognition and/or spoken sentence analysis may be executed accurately even when the wake-up word and a spoken sentence as a voice command continue without a pause therebetween, thus resulting in improvements in speech recognition processing performance.

In addition, the speech recognition device, in spite of being a uniform mass-produced product, permits a user to perceive the speech recognition device as a personalized device, and thus may create the effects of being a user-customized product.

In addition, a spoken utterance is buffered, and if the buffered spoken utterance contains a wake-up word, the speech recognition function is activated, and a spoken sentence, regardless of the position thereof, is isolated and processed, thus resulting in improvements in speech recognition processing performance.

In addition, the energy efficiency of the speech recognition device may be improved by allowing a voice command intended by the user to be recognized and processed using optimal processor resources alone.

In addition to the aforementioned, other processes and other systems for implementing the present disclosure, and computer programs for implementing such processes may be further provided.

Aspects, features, and advantages of the present disclosure other than the ones mentioned previously will become more apparent with reference to the accompanying drawings, the appended claims, and the detailed description of the present disclosure.

Advantages of the present disclosure are not limited to the foregoing features, and any other advantages not mentioned will become more apparent from the following detailed description to those skilled in the art to which the present disclosure pertains.

BRIEF DESCRIPTIONS OF DRAWINGS

The above and other aspects, features, and advantages of the present disclosure will become apparent from the detailed description of the following aspects in conjunction with the accompanying drawings, in which.

DETAILED DESCRIPTION

Figure 1:
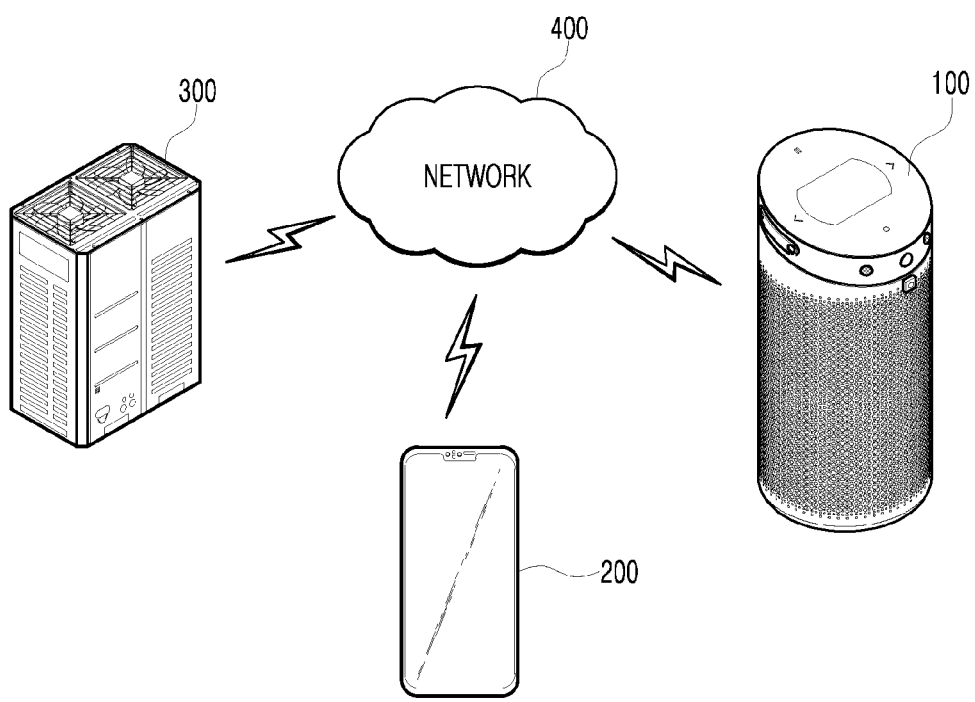
FIG. 1 is a diagram illustrating an example of a speech recognition environment according to an embodiment of the present disclosure, including a speech recognition device, a user terminal, a server, and a network connecting the speech recognition device, the user terminal, and the server to one another.

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if so deemed that such details are not necessary to obtain a complete understanding of the present disclosure.

The terminology used herein is used for the purpose of describing particular embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, the terms such as "first," "second," and other numerical terms may be used herein only to describe various elements, but these elements should not be limited by these terms. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or corresponding elements are designated by the same reference numeral, and repeated description of the common elements will be omitted.

FIG. 1 is a diagram illustrating an example of a speech recognition environment according to an embodiment of the present disclosure, including a speech recognition device, a user terminal, a server, and a network connecting the speech recognition device, the user terminal, and the server to one another.

FIG. 1 illustrates a state in which a speech recognition device 100, a user terminal 200, and a server 300 are communicatively connected to one another via a network 400. The speech recognition device 100 includes a communicator (110 in FIG. 3) for enabling transmission/reception of data with the server 300 and the user terminal 200 corresponding to a personal communication device, via the network 400 which may be wire-based or wireless.

The speech recognition device 100 may receive, recognize, and analyze a user's spoken utterance and provide a speech recognition service thereby. The speech recognition device 100 may include an artificial intelligence (AI) speaker and act as a hub controlling an electronic device not having speech input/output functionality.

Here, the spoken utterance may contain a wake-up word and a spoken sentence. The wake-up word is a designated command that activates the speech recognition function of the speech recognition device 100 and is herein referred to as "wake-up word". The speech recognition function is activated only when the wake-up word is present in the spoken utterance, and therefore, when the spoken utterance does not contain the wake-up word, the speech recognition function remains inactive (for example, in a sleep mode). Such a wake-up word may be preset and stored in a memory (160 in FIG. 3) which will be described later.

The spoken sentence is a part of the spoken utterance that does not contain the wake-up word, and may contain a voice command that the speech recognition device 100 can actually process and generate an output from. For example, if "Eeoseutaya eeokeoneul kyeojwo (Airstar, turn on the air conditioner)" is the spoken utterance, the wake-up word in this case would be "Eeoseutaya (Airstar)", and the spoken sentence would be "eeokeoneul kyeojwo (turn on the air conditioner)". In this case, the speech recognition device 100 may receive and analyze the spoken utterance, determine whether the wake-up word is present therein, and execute the spoken sentence, thereby controlling an air conditioner (not illustrated) as an electronic device.

In the present embodiment, the spoken sentence may be a unit for containing a single voice command. When the spoken sentence contains a single voice command, the wake-up word may be positioned before the spoken sentence, may be positioned after the spoken sentence, or may be positioned within the spoken sentence. When the wake-up word is positioned within the spoken sentence, the spoken sentence may include two or more spoken segments. For example, when the spoken utterance is "Eeokeoneul eeoseutaya kyeojwo (Turn on, Airstar, the air conditioner)", the wake-up word "eeoseuta (Airstar)" is positioned within the spoken sentence "Eeokeoneul kyeojwo (Turn on the air conditioner)". In this case, the spoken sentence may include a first spoken segment "Eeokeoneul (the air conditioner)" preceding the wake-up word, and a second spoken segment "kyeojwo (turn on)" following the wake-up word. Excluding the wake-up word positioned within the spoken sentence, the first spoken segment preceding the wake-up word and the second spoken segment following the wake-up word may be combined to form a spoken sentence which serves as a single voice command.

In some embodiments, the spoken sentence may include two or more voice commands. If the spoken sentence includes two or more voice commands, the wake-up word may be positioned between a first spoken sentence and a second spoken sentence; may be positioned before the first spoken sentence; may be positioned after the first spoken sentence (thereby preceding the second spoken sentence); or may be positioned within the first spoken sentence; may be positioned after the second spoken sentence; or may be positioned within the second spoken sentence. For example, given "Eeokeoneul kyeojwo eeoseutaya geurigo cheongjeong modeuro unjeonhaejwo (Turn on the air conditioner, Airstar, and drive it in clean mode)" as the user's spoken utterance, the wake-up word "eeoseuta (Airstar)" is positioned between the first spoken sentence "Eeokeoneul kyeojwo (turn on the air conditioner)" and the second spoken sentence "geurigo cheongjeong modeuro unjeonhaejwo (and drive it in clean mode)". Excluding the wake-up word positioned between the two spoken sentences, the first spoken sentence preceding the wake-up word and the second spoken sentence following the wake-up word may be individually processed, and a processing result thereof may be outputted; or the first spoken sentence preceding the wake-up word and the second spoken sentence following the wake-up word may be batch processed, and a processing result thereof may be outputted.

In the present embodiment, the speech recognition device 100 may buffer a spoken utterance containing a pause that is shorter than a preset duration, and may compare the buffered spoken utterance to a preset wake-up word to extract therefrom a standby wake-up word which corresponds to or contains the preset wake-up word. The speech recognition device 100 may analyze the role of the standby wake-up word within the spoken utterance; by using results of analyzing the role of the standby wake-up word, may determine a speech intent in uttering the standby wake-up word; and according to results of determining the speech intent in uttering the standby wake-up word, may determine whether to execute a spoken sentence as a voice command in the spoken utterance, and process the spoken sentence accordingly.

Here, the pause (or a cut-off section) may include a period of silence in the speech of a speaker, which distinguishes one narrative section from another in accordance with the norms of the written and spoken language. Such a pause may be positioned between words, between sentences, between a wake-up word (including a standby wake-up word) and a spoken sentence, between words within the spoken utterance, between two or more spoken sentences, and so forth. Generally, a pause shorter than a duration of 250 ms is not considered a pause (see http://www.iltec.pt/pdf/wpapers/2002-moliveira-pauses.pdf, 71.5% of pauses occur in the duration interval between 250 ms and 1 sec.). However, the length of duration that defines a pause may be adjusted by learning spoken utterances of an individual user. An example sentence of the spoken utterance containing a pause longer than or equal to a preset duration (for example, 250 ms) may be "Abeojiga bange deureogasinda (Father[pause]enters[pause]theroom)"; and an example sentence of the spoken utterance containing a pause shorter than the preset duration would be "Abeojigabangedeureogasinda (which could mean either "Father enters the room" or "Father enters the bag" in the Korean language without proper speech pauses). As can be seen in these examples, while a spoken utterance with a pause longer than or equal to the preset duration can convey the meaning of the sentence clearly, a spoken utterance with a pause shorter than the preset duration can only ambiguously convey the meaning of the sentence.

The standby wake-up word may be a word (or phrase) within a spoken utterance that corresponds to or contains the preset wake-up word stored in the memory 160, whose role within the spoken utterance or/and whose speech intent are ambiguous. For example, given "Eeoseutaeeokeoneulkyeojwo (Airstarturnontheairconditioner)" as the spoken utterance, the standby wake-up word in the spoken utterance in this case would be "Eeoseuta (Airstar)", which contains the preset wake-up word. In addition, the role of the standby wake-up word may be ambiguous before determining whether the standby wake-up word is used as a deliberate wake-up word or as an inadvertent wake-up word in a given spoken utterance.

For instance, given "Eeoseutaeeokeoneulkyeojwo (Airstarturnontheairconditioner)" as the spoken utterance, the standby wake-up word in the spoken utterance in this case would be "Eeoseuta (Airstar)", which corresponds to the preset wake-up word. In this case, by analyzing the role of the standby wake-up word and determining the speech intent in uttering the standby wake-up word, the processes which will be described later, it could be determined that the standby wake-up word "Eeoseuta (Airstar)" is used as a deliberate wake-up word in this spoken utterance. As another example, given "Eeoseutaneunpyeollihaningongjineungseupikeoida (Airstarisaconvenientartificialintelligencespeaker)" as the spoken utterance, the standby wake-up word in the spoken utterance would be "Eeoseuta (Airstar)", which corresponds to the present wake-up word. In this case In addition, through the processes of analyzing the role of the standby wake-up word and determining the speech intent in uttering the standby wake-up word, which will be described later, it could be determined that the standby wake-up word "Eeoseuta (Airstar)" is used as an inadvertent wake-up word in this spoken utterance.

The term "deliberate wake-up word" used herein refers to a designated word (or phrase) that serves the function of activating the speech recognition function and bringing the speech recognition device into a state ready to receive a voice command from a user. In other words, the deliberate wake-up word is a wake-up word uttered by the user with the intention of interacting with the speech recognition device. In addition, the term "inadvertent wake-up word" used herein refers to a wake-up word whose role and speech intent in a given spoken utterance do not lead to playing the role of a deliberate wake-up word. In other words, the inadvertent wake-up word is a wake-up word uttered by a user without the intention of interacting with the speech recognition device. Thus, the inadvertent wake-up word may be included as a standby wake-up word that does not serve the role of the deliberate wake-up word in a given spoken utterance.

There are several shortcomings with existing speech recognition processing in the related art. For example, there have been issues with existing speech recognition processing in the related art in which wake-up word recognition and/or spoken sentence are not accurately executed when the pause between the wake-up word and a spoken sentence as a voice command is shorter than a preset duration, producing unclear boundaries between the wake-up word and the spoken sentence. However, the speech recognition according to the present embodiment enables the execution of accurate wake-up word recognition and/or spoken sentence analysis even when the pause between the wake-up word and the spoken sentence as a voice command is shorter than the preset duration, resulting in improvements in speech recognition processing performance.

In the present embodiment, the speech recognition device 100 may analyze the role of the standby wake-up word in a given spoken utterance through a natural-language processing algorithm that performs, on the spoken utterance, one or more selected from among morphological segmentation, part-of-speech tagging, sentence breaking, parsing, and named-entity recognition. By using the results of analyzing the role of the standby wake-up word, the speech recognition device 100 may determine whether the standby wake-up word is uttered as a deliberate wake-up word or an inadvertent wake-up word within a given spoken utterance.

If the results of determining the speech intent in uttering the standby wake-up word indicate that the standby wake-up word is uttered as a deliberate wake-up word, the speech recognition device 100 may activate the speech recognition function and execute the spoken sentence. Alternatively, if the results of determining the speech intent in uttering the standby wake-up word indicate that the standby wake-up word is uttered as an inadvertent wake-up word, the speech recognition device 100 may cause the speech recognition function to remain inactive.

In some embodiments, if the results of determining the speech intent in uttering the standby wake-up word indicate that the standby wake-up word is uttered as a deliberate wake-up word, the speech recognition device 100 may isolate, from the spoken utterance, the spoken sentence without the deliberate wake-up word. For example, the speech recognition device 100 may isolate, from the spoken utterance, the spoken sentence positioned before the deliberate wake-up word; may isolate, from the spoken utterance, the spoken sentence positioned after the deliberate wake-up word; may isolate, from the spoken utterance, the spoken sentence without the deliberate wake-up word positioned within the spoken sentence; and may isolate, from the spoken utterance containing two or more spoken sentences, the two or more spoken sentences without the deliberate wake-up word positioned therebetween.

The user terminal 200 may control driving of the speech recognition device 100 through the server 300. Furthermore, the user terminal 200 may receive, from the speech recognition device 100, various messages regarding the operation of the speech recognition device 100. Types of such messages may include, but are not limited to, notification messages indicating the start and/or end of speech recognition processing of the speech recognition device 100, alarm messages indicating the occurrence of an anomalous situation within the speech recognition device 100, and so forth. These notification message and/or alarm message may be simultaneously transmitted and outputted through the user terminal 200 and a user interface (not illustrated) of the speech recognition device 100.

The user terminal 200 may include, but is not limited to, a communication terminal capable of executing functions of a computing device (not illustrated), and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. In addition, the user terminal 200 may be a wearable terminal implemented with communication function and data processing function, in the form of a watch, glasses or goggles, a hairband, a ring, or the like. The user terminal 200 is not limited to the aforementioned items and may be any terminal capable of web-browsing.

The server 300 may be a database server for providing big data required for applications of various artificial intelligence algorithms, data on speech recognition, and the like. Furthermore, the server 300 may include a web server or application server which enables a remote control over the speech recognition device 100 by using an application or web-browser installed on the user terminal 200.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

In addition, AI does not exist on its own, but is rather directly or indirectly linked to a number of other fields in computer science. Particularly in recent years, there have been numerous attempts to introduce an element of AI into various fields of information technology to solve problems in the respective fields.

Machine learning is an area of artificial intelligence that includes the field of study that gives computers the capability to learn without being explicitly programmed More specifically, machine learning is a technology that studies and builds systems capable of learning, making predictions, and enhancing its own performance on the basis of experiential data, and algorithms for such systems. Machine learning algorithms, rather than executing rigidly-set static program commands, may be used to take an approach that builds models for deriving predictions and decisions from inputted data.

The server 300 may buffer a spoken utterance received from the speech recognition device 100 and containing no pause, compare the buffered spoken utterance to a preset wake-up word to extract therefrom a standby wake-up word corresponding to or containing the preset wake-up word, analyze the role of the standby wake-up word in the spoken utterance, determine the speech intent in uttering the standby wake-up word by analyzing the results of analyzing the role of the standby wake-up word, determine whether to execute a spoken sentence as a voice command in the spoken utterance on the basis of the results of determining the speech intent in uttering the standby wake-up word, process the spoken sentence, and transmit the processing results to the speech recognition device 100. In other words, the process of speech recognition processing may be executed by the server 300.

The network 400 may serve to connect the speech recognition device 100 and the user terminal 200 to each other. The network 400 includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. In addition, the network 400 may transmit/receive data using short-range communication and/or long-range communication technologies. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include interconnections among network elements, such as hubs, bridges, routers, switches, gateways, and so forth. The network 400 may include a public network such as the Internet, and a private network such as an organization's secured private network, and may also include one or more connected networks as in a multi-network condition. Access to the network 400 may be provided through one or more wire-based or wireless access networks.

Figure 2:
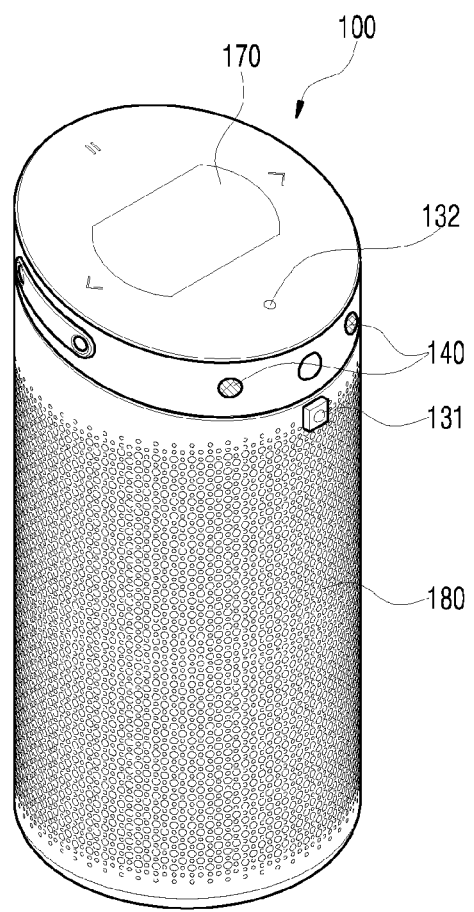
FIG. 2 is a diagram illustrating an example of an outer appearance of a speech recognition device according to an embodiment of the present disclosure.
Figure 3:
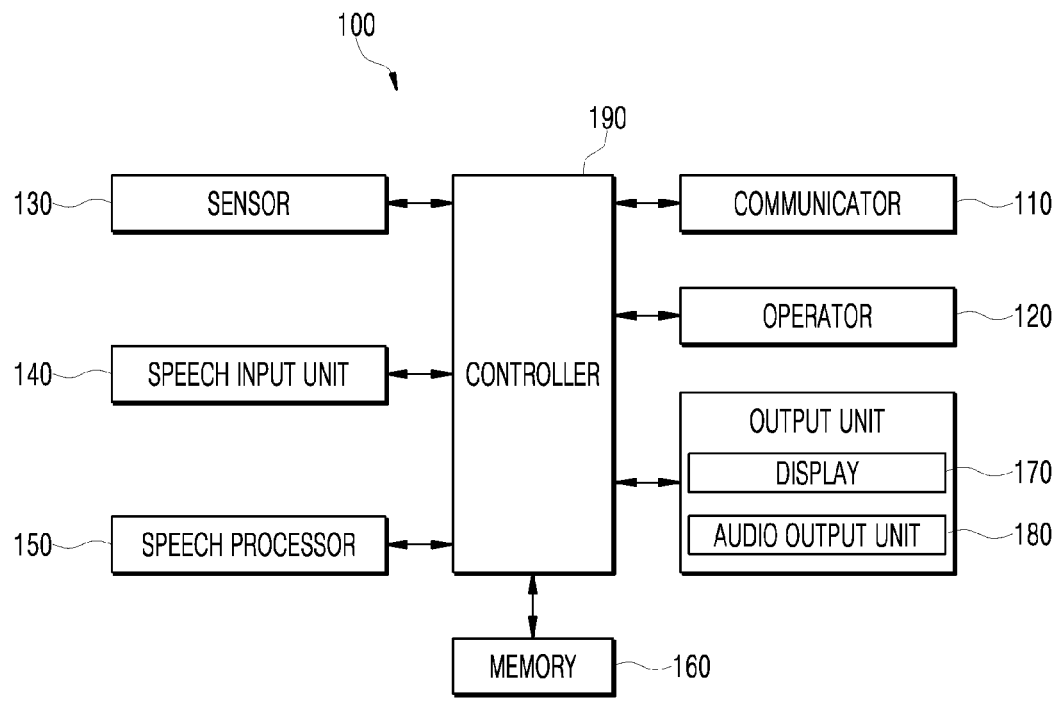
FIG. 3 is a schematic block diagram of a speech recognition device according to an embodiment of the present disclosure.

FIG. 2 is a schematic diagram showing an example of the outer appearance of a speech recognition device according to an embodiment of the present disclosure, and FIG. 3 is a schematic block diagram of a speech recognition device according to an embodiment of the present disclosure. Hereinbelow, a description of the parts previously described with reference to FIG. 1 will be omitted. Referring to FIG. 2 and FIG. 3, the speech recognition device 100 may include a communicator 110, an operator 120, a sensor 130 including a proximity sensor 131 and an image sensor 132, a speech input unit 140, a speech processor 150, a memory 160, a display 170, an audio output unit 180, and a controller 190.

The communicator 110 may provide, in connection with the network 400, a communication interface required to provide transmission/reception signals as packet data between the speech recognition device 100 and another electronic device and/or the user terminal 200. Moreover, the communicator 110 may receive a predetermined information request signal from an electronic device and/or the user terminal 200, and may transmit the information processed by the speech recognition device 100 to the electronic device and/or the user terminal 200. In addition, the communicator 110 may be a device including hardware and software necessary for transmitting/receiving signals, such as control signals or data signals, through wire-based or wireless connection with other network devices.

In the present embodiment, other electronic devices may also include home appliances without speech input/output functionality, such as an air conditioner, a refrigerator, a laundry machine, and so on, and these home appliances may be controlled by using the speech recognition device 100. Furthermore, other electronic devices may include home appliances provided with speech input/output functionality, that is, home appliances with the function of the speech recognition device 100.

The operator 120 may have a plurality of operable buttons (not illustrated) and may transmit, to the controller 190, the signal corresponding to an operated button. In the present example embodiment, the operator 120 may include first to fourth contact switches (not illustrated) wherein the exact process of processing an output signal by each contact switch may be determined by a program prestored in the memory 160. For example, menu items displayed on the display 170 in left and right directions may be selected by an operation signal from the first contact switch or the second contact switch; and menu items displayed on the display 170 in upward and downward directions may be selected by an operation signal from the third contact switch or the fourth contact switch. In addition, the speech recognition function may be activated by operating one of the first to fourth contact switches.

The sensor 130 may include the image sensor 132 and the proximity sensor 131 configured to sense a surrounding condition around the speech recognition device 100. For example, the proximity sensor 131 may acquire location data of an object (for example, a user) located around the speech recognition device 100 by using far-infrared rays or the like. Furthermore, the user location data acquired by the proximity sensor 131 may be stored in the memory 160.

The image sensor 132 may include a camera (not illustrated) capable of capturing an image of the surrounding of the speech recognition device 100, and for image-capturing efficiency, a plurality of cameras may be provided therein. For example, each camera may include an image sensor (for example, a CMOS image sensor) which includes at least one optical lens and a plurality of photodiodes (for example, pixels) producing an image by using the light passed through the optical lens, and may include a digital signal processor (DSP) for producing an image based on signals outputted from the photodiodes. The digital signal processor may generate not only a static image, but also a dynamic image formed by frames of static images. Furthermore, an image captured and acquired by a camera serving as the image sensor 132 may be stored in the memory 160.

Although the sensor 130 is limited to the proximity sensor 131 and the image sensor 132 in the present example embodiment, the sensor 130 may also include various other sensors, such as a temperature sensor, a humidity sensor, a vibration sensor, etc., each capable of sensing a surrounding condition around the speech recognition device 100. Furthermore, the information detected by the sensor 130 may be stored in the memory 160.

The speech input unit 140 may receive a spoken utterance that a user has uttered towards the speech recognition device 100. To this end, the speech input unit 140 may be provided with one or more microphones (not illustrated). Further, to enable more accurate reception of the spoken utterance, the speech input unit 140 may be provided with a plurality of microphones (not illustrated). Here, the plurality of microphones may be disposed in different locations, spaced apart from each other, and may process the spoken utterance received from the user, into electric signals.

In some embodiments, the speech input unit 140 may use various noise removal algorithms for removing the noise generated while receiving the spoken utterance. In some embodiments, the speech input unit 140 may include various components for processing speech signals, such as a filter (not illustrated) for removing the noise upon receiving a spoken utterance from a user, an amplifier (not illustrated) for amplifying signals outputted from the filter and outputting the amplified signals.

The speech processor 150 may buffer a spoken utterance inputted through the speech input unit 140 and containing a pause shorter than a preset duration, and may compare the buffered spoken utterance to a preset wake-up word to extract therefrom a standby wake-up word which corresponds to or contains the preset wake-up word. The speech processor 150 may analyze the role of the standby wake-up word within the spoken utterance, and by using the results of analyzing the role of the standby wake-up word, may determine the speech intent in uttering the standby wake-up word. Subsequently, the controller 190 may activate the speech recognition function in response to the results of determining the speech intent in uttering the standby wake-up word, and may determine whether to execute a spoken sentence as a voice command in the spoken utterance, and process the spoken sentence accordingly. Hereinbelow, the speech processor 150 will be described in greater detail with reference to FIG. 4 and FIG. 5.

The memory 160 may have recorded therein various data required for the operation of the speech recognition device 100 and may include a volatile or non-volatile recording medium. The recording medium is configured to store data readable by the controller 190, and may include a hard disk drive (HDD), a solid state disk (SSD), a silicon disk drive (SDD), ROM, RAM, CD-ROM, a magnetic tape, a floppy disk, a light data storage device, etc.

Meanwhile, the data for speech recognition may be stored in the memory 160, and the controller 190 may determine, based on the results of determining the speech intent in uttering the standby wake-up word, whether to execute the spoken sentence as a voice command in the spoken utterance, and process the spoken sentence accordingly.

Here, relatively simple speech recognition may be executed by the speech recognition device 100, while relatively more advanced speech recognition, such as natural language processing, may be executed on the server 300. For instance, upon receiving a spoken utterance signal corresponding to or containing a preset wake-up word, the speech recognition device 100 may switch to a state for receiving a spoken sentence as a voice command. Then, the speech recognition device 100 may execute the speech recognition process only up to the stage where the input of the wake-up word is determined, while the subsequent rest of the speech recognition process for interpreting the contents of a voice command in the inputted spoken utterance may be executed on the server 300. Since the system resource of the speech recognition device 100 is limited, complicated natural language recognition and processing may be executed on the server 300.

The memory 160 may store therein limited data. For example, the memory 160 may store therein a preset wake-up word for determining the presence of a wake-up word in a spoken utterance. The wake-up word may be set by the manufacturer. For instance, "Eeoseuta (Airstar)" may be set as the wake-up word, and may be later modified by a user.

The processing results of a spoken sentence processed by the controller 190 may be outputted through an output unit, and the output unit may include a display 170 and an audio output unit 180. The display 170 may display, as image, processing results, operation mode, operation status, error status, etc. corresponding to the spoken sentence within the spoken utterance. In some embodiments, the display 170 may include a touchscreen which forms an interlayer structure with a touchpad. In this case, the display 170 may be utilized, not only as an output device, but also as an input device to which data can be inputted by user's touch.

The display 170 may display an operation mode, a current state, and setting items of the speech recognition device 100, through various visual images, letters, numbers, and symbols, as well as graphic images such as icons. The display 170 may display information corresponding to each stage involved in the process of processing inputted speech.

The audio output unit 180 may output an audio signal. For example, under control of the controller 190, the audio output unit 180 may output, as audio, an alarm sound, notification messages regarding an operation mode, an operation status, an error status, etc., information corresponding to user's spoken sentence, and processing results corresponding to user's spoken sentence, etc. The audio output unit 180 may convert electric signals from the controller 190 into audio signals and output the converted audio signals. To this end, the audio output unit 180 may be provided with a speaker (not illustrated) or the like.

The controller 190 may cause the display 170 to provide visual information corresponding to each stage of a speech recognition process and an electronic device control process, and may cause the audio output unit 180 to provide audio information corresponding to each stage of a speech recognition process and an electronic device control process. In the present embodiment, the controller 190 may control such that the processing results of a spoken sentence isolated by the speech processor 150 are outputted through the display 170 and/or the audio output unit 180.

The controller 190 may be a central processor capable of providing various functions such as driving a control software installed in the memory 160, causing the display 170 and/or the audio output unit 180 to output the processing results of a spoken sentence, etc. Here, the controller 190 may include devices of all kinds that are capable of processing data, such as a processor. Here, the term 'processor' may refer to a data processing device embedded in hardware, which has a physically structured circuit for performing functions represented as a code or command included in programs. Examples of the data processing device embedded in hardware include processing devices such as a microprocessor, a central processor (CPU), a processor core, a multiprocessor, an application-specific integrated circuit (ASIC), a field programmable gate array (FPGA), and the like, but the scope of the present disclosure is not limited thereto.

In the present embodiment, the speech recognition device 100 may perform machine learning such as deep learning on user's spoken utterance signals, and the memory 160 may store therein data to be used in machine learning, result data, and the like.

Machine learning is an area of artificial intelligence that includes the field of study that gives computers the capability to learn without being explicitly programmed More specifically, machine learning is a technology that studies and builds systems capable of learning, making predictions, and enhancing its own performance on the basis of experiential data, and algorithms for such systems. Machine learning algorithms, rather than executing rigidly-set static program commands, may take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree is an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning SVM may include a supervised learning model for pattern detection and data analysis, heavily used in classification and regression analysis The speech recognition device 100 may be provided with an artificial neural network, and may perform machine learning-based user recognition and user speech recognition by using audio input signals as input data.

ANN is a data processing system modelled after the mechanism of biological neurons and interneuron connections, in which a number of neurons, referred to as nodes or processing elements, are interconnected in layers. ANNs are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

The controller 190 may include an artificial neural network model. Examples of the artificial neural network model include, but are not limited to, a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is a machine learning method that makes use of both labeled training data and unlabeled training data.

One of semi-supervised learning techniques involves reasoning the label of unlabeled training data, and then using this reasoned label for learning. This technique may be used advantageously when the cost associated with the labeling process is high.

Reinforcement learning is a theory that given the condition under which a reinforcement learning agent can determine what action to choose at each time instance, the agent can find an optimal path solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

The architecture of an artificial neural network is characterized by features of its model, the features including an activation function, a loss function or cost function, a learning algorithm, an optimization algorithm, and so forth. In addition, hyperparameters are set before learning, and model parameters are set through the learning, thereby specifying the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. In addition, the model parameters may include various parameters sought to be determined through learning.

For instance, the hyperparameters may include initial values of weights and biases between nodes, a mini-batch size, an iteration number, a learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the architecture and learning optimization algorithms of the artificial neural network but also on the hyperparameters thereof. Therefore, in order to obtain a good learning model, it is important to choose appropriate architecture and learning algorithms for the artificial neural network, but also to choose appropriate hyperparameters.

In general, the artificial neural network is first taught experimentally by setting hyperparameters to various values, and the hyperparameters are set to optimal values that provide stable learning rate and accuracy based on the training results.

Figure 4:
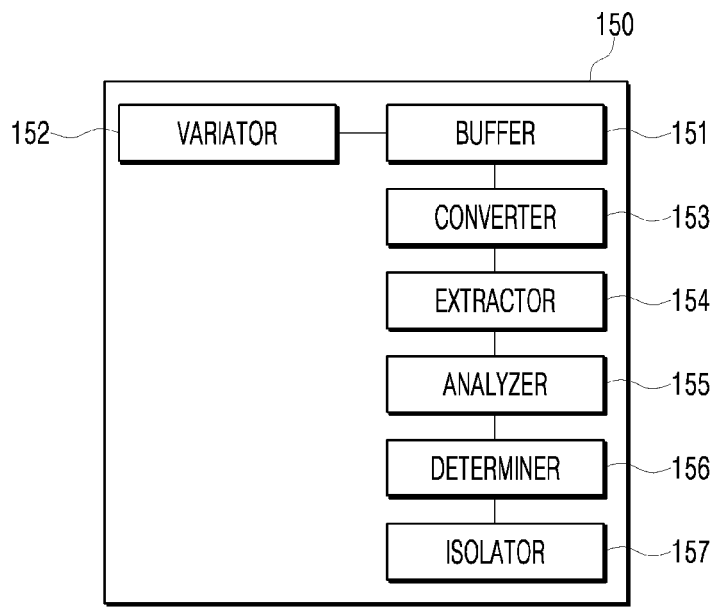
FIG. 4 is a schematic block diagram of a speech processor of the speech recognition device shown in FIG. 3, according to an example embodiment.

FIG. 4 is a schematic block diagram of a speech processor of the speech recognition device shown in FIG. 3, according to an embodiment. In the following description, a repetitive description of the parts previously described with reference to FIG. 1 to FIG. 3 will be omitted. Referring to FIG. 4, a speech processor 150 according to an embodiment may include a buffer 151, a variator 152, a converter 153, an extractor 154, an analyzer 155, a determiner 156, and an isolator 157.

The buffer 151 may buffer a user's spoken utterance inputted through the speech input unit 140. Here, the spoken utterance may include a spoken utterance in which a pause does not exist between a standby wake-up word and a spoken sentence as a voice command. In addition, the spoken utterance may include a spoken utterance which contains a pause between a standby wake-up word and a spoken sentence as a voice command.

In the present embodiment, the buffer 151 may include a static buffer with a fixed capacity for buffering user's spoken utterance. In the present embodiment, the buffer 151 may include a dynamic buffer having varying capacity for buffering user's spoken utterance.

The variator 152 may vary the buffering volume or buffering time of the buffer 151 being used as a dynamic type, in response to a condition under which a spoken utterance is inputted.

Here, the condition under which the spoken utterance is inputted may include a time at which the spoken utterance is inputted, a place at which the spoken utterance is inputted, a pitch of the spoken utterance, accuracy of the spoken utterance, gender of the speaker of the spoken utterance, speed of the spoken utterance, and so forth. Since each condition under which the spoken utterance is inputted is given its own reference value, when comparing a particular condition to a corresponding reference value, the variator 152 may hold the buffering volume or buffering time in a current state if that condition falls within an error range of the corresponding reference value; may decrease the buffering volume or buffering time to be less than a current state if the condition under which the spoken utterance is inputted exceeds the corresponding reference value; and may increase the buffering volume or buffering time to be greater than the current state if that condition under which the spoken utterance is inputted is less than the corresponding reference value. Here, given that a given reference value varies from one condition to another, under which the spoken utterance is inputted, when a particular condition is compared to a corresponding reference value, the buffering volume or buffering time may increase to be greater than a current state if the condition exceeds the reference value; and the buffering volume or buffering time may decrease to be less than a current state if the condition is less than the reference value.

The converter 153 may convert the buffered spoken utterance to text.

The extractor 154 may compare the converted text of the spoken utterance to a preset wake-up word stored in the memory 160, to extract, from the converted text of the spoken utterance, a standby wake-up word that corresponds to or contains the preset wake-up word.

The analyzer 155 may analyze the role of the standby wake-up word within the converted text of the spoken utterance. The analyzer 155 may analyze the role of the standby wake-up word on the basis of named-entity recognition (NER) and/or natural-language processing (NLP) which performs, on the spoken utterance, at least one selected from among morphological segmentation, part-of-speech tagging, sentence breaking, and parsing.

Here, the natural-language processing refers to a fundamental technology including natural-language understanding, which analyzes a speech uttered by a human and converts it into a machine language understandable by computers, and/or represents the machine language in a language understandable by human. Conventionally, natural-language processing techniques include a rule-based approach, a statistical approach, a hybrid approach exploiting the advantages of the statistical approach and the rule-based approach, and an artificial neural network approach. In particular, deep learning that has emerged to be promising in recent years may belong to the artificial neural network approach. A deep learning-based approach may include an approach that takes an input sentence and an output sentence as a pair, and tries to find the most appropriate expression and translation results.

In addition, named-entity recognition is one of the most commonly used techniques used in information extraction for recognizing and classifying named entities mentioned in spoken utterances that have been converted to text, such as the names of persons, organizations, locations, etc., and expressions of times, quantities, monetary values, percentages, etc. Furthermore, named-entity recognition, given its ability to extract structured information from unstructured text, can be regarded as a technique extremely important not only in the fields of natural-language processing and information extraction, but also in the field of big data analytics for which there has been an increasing demand in line with advances in web technology. Named-entity recognition has the following three approaches to recognize named entities: dictionary based approach; rule based approach; and machine learning based approach.

Through natural-language processing and/or named-entity recognition of the converted text of the spoken utterance, the analyzer 155 may analyze whether the standby wake-up word is associated with a calling particle, such as "a/ya/(i) yeo/(i)siyeo", and thus is vocatively uttered, or whether the standby wake-up word is uttered vocatively without being associated with a calling particle.

In some embodiments, through natural-language processing and/or named-entity recognition of the converted text of the spoken utterance, the analyzer 155 may analyze the sentence type of the spoken utterance by taking into account a relationship between one or more words within the spoken sentence that may or may not contain the standby wake-up word. Examples of the sentence type include a declarative sentence, an interrogative sentence, an imperative sentence, an exclamatory sentence, an optative sentence, and so forth. If the role of the standby wake-up word analyzed by the analyzer 155 is ambiguous, the role (the sentence type) of the spoken sentence may be further analyzed.

The determiner 156 may determine the speech intent in uttering the standby wake-up word based on the results of analyzing the role of the standby wake-up word and/or analyzing the role of the spoken sentence. More specifically, determining the speech intent in uttering the standby wake-up word may include determining that the standby wake-up word is uttered as deliberate wake-up word in a given spoken utterance, or may include determining that the standby wake-up word is uttered as inadvertent wake-up word in a given spoken utterance.

If the analysis results from the analyzer 155 indicate that the standby wake-up word is associated with a calling particle within the converted text of the spoken utterance, the determiner 156 may determine that the speech intent in uttering the standby wake-up word is to utter a deliberate wake-up word. For instance, given "Eeokeoneulkyeo-jwoeeoseutaya" as the converted text of the spoken utterance, where the standby wake-up word "eoseuta (Airstar)" is associated with a calling particle, the determiner 156 would determine that the speech intent in uttering the standby wake-up word is to utter a deliberate wake-up word, that is, the user has uttered the standby wake-up word with the intention of interacting with the speech recognition device.

In one embodiment, even when the analysis results from the analyzer 155 indicate that there is no calling particle associated with the standby wake-up word within the converted text of a given spoken utterance, if the standby wake-up word has a vocative meaning, the determiner 156 would determine that the speech intent in uttering the standby wake-up word is to utter a deliberate wake-up word. For example, if "Eeoseutaeeokeoneulkyeojwo (Airstarturnontheairconditioner)" is the converted text of the spoken utterance, although the standby wake-up word "Eeoseuta (Airstar)" is not associated with a calling particle, the standby wake-up word has a vocative meaning, and therefore, the determiner 156 may determine that the speech intent in uttering the standby wake-up word is to utter a deliberate wake-up word, in other words, that the user has uttered the standby wake-up word with the intention of interacting with the speech recognition device.

In some embodiments, if the analysis results from the analyzer 155 indicate that the spoken utterance contain a standby wake-up word, and the sentence type of the spoken sentence is interrogative or imperative, the determiner 156 would determine that the speech intent in uttering the standby wake-up word is to utter a deliberate wake-up word. For example, given the converted text of the spoken utterance "Eeoseutaeeokeoneulkyeojullae? (Airstarcouldyouturnontheairconditioner?)", since the standby wake-up word is present and the sentence type of the spoken utterance is interrogative, the determiner 156 would determine that the speech intent in uttering the standby wake-up word is to utter a deliberate wake-up word, in other words, that the user has uttered the standby wake-up word with the intention of interacting with the speech recognition device.

If the analysis results from the analyzer 155 indicate that the standby wake-up word is uttered not as a vocative case within the converted text of the spoken utterance, but as a sentence component (for example, a subject, an object, etc.), or if the standby wake-up word is used with a spoken sentence whose sentence type is not interrogative nor imperative, the determiner 156 may determine that the speech intent in uttering the standby wake-up word is to utter an inadvertent wake-up word. For instance, given the converted text of the spoken utterance "Eeoseutaneunpyeollihaningongjineungseupikeoida (Airstarisaconvenientartificialintelligencespeaker)", the standby wake-up word "Eeoseuta (Airstar)" is not uttered as a vocative case, but used as a subject combined with a subject particle, and therefore, the determiner 156 may determine that the speech intent in uttering the standby wake-up word is to utter an inadvertent wake-up word, in other words, that the user has uttered the standby wake-up word without the intention of interacting with the speech recognition device. Furthermore, since the spoken utterance in the cases described above is a declarative sentence, not an interrogative or imperative sentence, the determiner 156 may determine that the speech intent in uttering the standby wake-up word is to utter an inadvertent wake-up word, in other words, that the standby wake-up word is uttered without the intention of interacting with the speech recognition device.

Upon receiving, from the determiner 156, the results of determining the speech intent in uttering the standby wake-up word, the controller 190 may control such that speech recognition function is activated and the spoken sentence is executed, if the results of determining the speech intent in uttering the standby wake-up word indicate that the standby wake-up word is uttered as a deliberate wake-up word. Alternatively, if the results of determining the speech intent in uttering the standby wake-up word indicate that the standby wake-up word is uttered as an inadvertent wake-up word without the intention of interacting with the speech recognition device, the controller 190 may control such that the speech recognition function remains inactive.

In some embodiments, if the results of determining the speech intent in uttering a standby wake-up word indicate that the standby wake-up word is uttered as a deliberate wake-up word, the isolator 157 may isolate, from the converted text of the spoken utterance, a spoken sentence without the deliberate wake-up word. More specifically, the isolator 157 may isolate the spoken sentence to be processed by the controller 190 from the converted text of a spoken utterance. For example, the isolator 157 may isolate a spoken sentence preceding the wake-up word from the spoken utterance; isolate the spoken sentence following the wake-up word from the spoken utterance; isolate first and second spoken segments from the spoken utterance without the wake-up word, wherein the first spoken segment precedes the wake-up word, the second spoken segment follows the wake-up word, and the wake-up word is positioned within the spoken sentence; and from the spoken utterance containing two or more spoken sentences, isolating the two or more spoken sentences without the wake-up word positioned between the two or more spoken sentences.

Subsequently, the controller 190 may control such that it is determined whether to execute the spoken sentence as a voice command, isolated from the spoken utterance by the isolator 157, and the spoken sentence is processed accordingly. The controller 190 may control such that spoken segments positioned before and after the wake-up word, isolated by the isolator 157, are combined together and processed as a single voice command, and the processing result thereof is outputted.

The controller 190 may control such that the spoken sentence is processed, and the processing result of the spoken sentence is outputted through the display 170 and/or the audio output unit 180. Here, the processing result of the spoken sentence may contain the result of controlling an electronic device, to which the speech recognition device 100 is connected, in accordance with the spoken sentence.

In some embodiments, with respect to two or more spoken sentences, the controller 190 may control such that the results of sequentially processing the two or more spoken sentences are sequentially outputted through the display 170 and/or the audio output unit 180. Alternatively, the controller 190 may control such that the results of batch processing the two or more spoken sentences are outputted through the display 170 and/or the audio output unit 180 at once.

Figure 5:
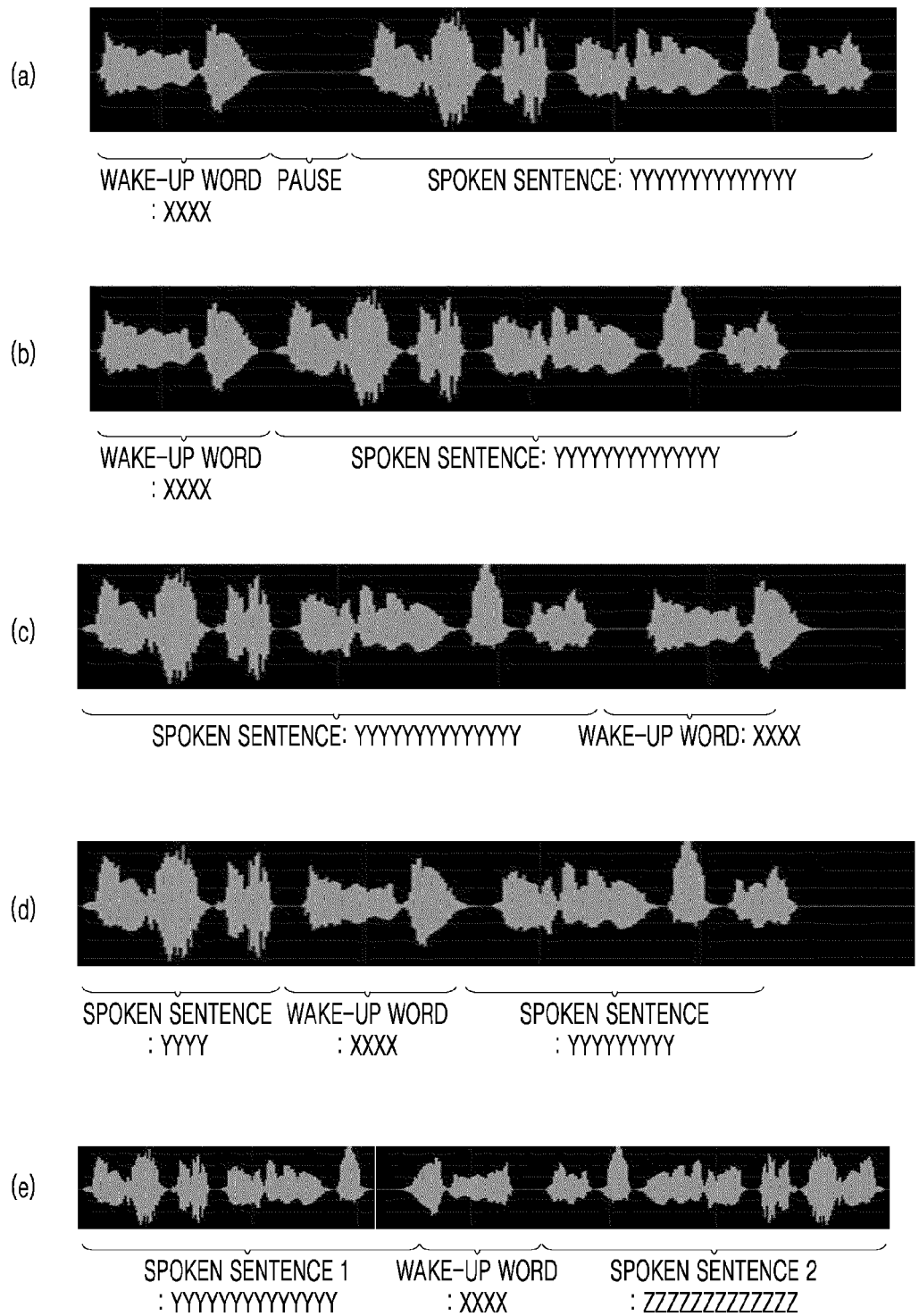
FIG. 5 is waveform diagrams of user's spoken utterances stored in a buffer of the speech recognition device shown in FIG. 3.

FIG. 5 is waveform diagrams of user's spoken utterances stored in a buffer of the speech recognition device shown in FIG. 3. In the following description, a repetitive description of the parts previously described with reference to FIG. 1 to FIG. 4 will be omitted. Referring to FIG. 5, FIG. 5A illustrates a waveform diagram of user's spoken utterance containing a pause longer than a preset duration, between a wake-up word and a voice command. FIG. 5B to FIG. 5E illustrate waveform diagrams of user's spoken utterances buffered by the buffer 151 which contain a pause shorter than a preset duration between the wake-up word and the voice command.

FIG. 5A illustrates a user's spoken utterance in which a pause between the wake-up word and the spoken sentence as a voice command is longer than or equal to a preset duration, and due to clear boundaries between the wake-up word and the spoken sentence, the spoken sentence can be processed after the wake-up word is recognized.

FIG. 5B through FIG. 5E illustrate user's spoken utterances each containing a pause shorter than a preset duration between the wake-up word and the spoken sentence, and in these cases, due to unclear boundaries between the wake-up word and the spoken sentence, wake-up word recognition and/or spoken sentence analysis may not be executed accurately. To address this issue, a spoken utterance of a certain duration, which contains a pause shorter than a preset duration, may be temporarily stored; and once, by analyzing the role of a standby wake-up word contained in the spoken utterance, it is determined that the speech intent in uttering the standby wake-up word is to utter a deliberate wake-up word, the wake-up word may be isolated from the spoken utterance to activate the speech recognition function; in the buffered spoken utterance, a spoken sentence excluding the wake-up word may be processed; and the processing results thereof may be outputted.

FIG. 5B illustrates a case in which a user's spoken utterance is buffered by the buffer 151, wherein the spoken utterance contains a pause shorter than a preset duration between a wake-up word and a spoken sentence, and the spoken sentence is positioned after the wake-up word. For example, the spoken utterance in this case may be "Eeoseutayaeeokeoneulkyeojwo (Airstartumontheairconditioner)", in which the standby wake-up word ("Eeoseuta" (Airstar)) is present in the buffered spoken utterance, and the standby wake-up word is uttered as a deliberate wake-up word, as indicated by the results of analyzing the standby wake-up word and determining the speech intent in uttering the standby wake-up word. In this case, the controller 190 may activate the speech recognition function, the speech processor 150 may isolate the spoken sentence without the wake-up word, "eeokeoneulkyeojwo (tumontheairconditioner)" from the spoken utterance, and the controller 190 may control such that the processing results of the spoken sentence (the air conditioner being turned on) are outputted.

FIG. 5C illustrates a case in which a user's spoken utterance is buffered by the buffer 151, wherein the spoken utterance contain a pause shorter than a preset duration between a wake-up word and a spoken sentence, and the spoken sentence is positioned before the wake-up word. For example, the spoken utterance in this case may be "Eeokeoneulkyeojwoeeoseutaya (Airstarturnontheairconditioner)" in which the standby wake-up word ("eoseuta" (Airstar)) is present in the buffered spoken utterance, and the standby wake-up word is uttered as a deliberate wake-up word as indicated by the results of analyzing the standby wake-up word and determining the speech intent in uttering the standby wake-up word. In this case, the controller 190 may activate the speech recognition function, the speech processor 150 may isolate, from the spoken utterance, the spoken sentence without the wake-up word, "Eeokeoneulkyeojwoe (turnontheairconditioner)", and the controller 190 may control such that the processing results of the spoken sentence (the air conditioner being turned on) are outputted.

FIG. 5D illustrates a case in which a user's spoken utterance is buffered by the buffer 151, wherein the spoken utterance contains a pause shorter than a preset duration between a wake-up word and a spoken sentence, and the wake-up word is positioned within the spoken sentence, more specifically, between a spoken segment preceding the wake-up word and a spoken segment following the wake-up word. For example, the spoken utterance in this case may be "Eeokeoneureeoseutayakyeojwo (TurnonAirstartheairconditioner)" in which the standby wake-up word (eoseuta, (Airstar)) is present in the buffered spoken utterance, and the standby wake-up word is uttered as a deliberate wake-up word, as indicated by the results of analyzing the role of the standby wake-up word and determining the speech intent in uttering the standby wake-up word. In this case, the controller 190 may activate the speech recognition function, the speech processor 150 may isolate, from the spoken utterance, the spoken sentence without the wake-up word, "Eeokeoneulkyeojwoe (turnontheairconditioner)", and the controller 190 may control such that the processing results of the spoken sentence (the air conditioner being turned on) are outputted.

FIG. 5E illustrates a case in which a user's spoken utterance is buffered by the buffer 51, wherein the spoken utterance contains a pause shorter than a preset duration between a wake-up word and spoken sentences, and the wake-up word is positioned between two spoken sentences within the spoken utterance (spoken sentence 1: a first spoken sentence preceding the wake-up word, and spoken sentence 2: a second spoken sentence following the wake-up word). For example, the spoken utterance in this case may be "Eeokeoneulkyeojwoeeoseutayageurigogonggicheongjeongmodeurodongjakae (TurnontheairconditionerAirstaranddriveitincleanmode)" in which the standby wake-up word "eoseuta, (Airstar)" is present in the buffered spoken utterance, and the standby wake-up word is uttered as a deliberate wake-up word, as indicated by the results of analyzing the standby wake-up word and determining the speech intent in uttering the standby wake-up word. In this case, the controller 190 may activate the speech recognition function, the speech processor 150 may isolate, from the buffered spoken utterance, the spoken sentence 1 "Eeokeoneulkyeojwo (turnontheairconditioner)" and the second spoken sentence "gonggicheongjeongmodeurodongjakae (anddriveitincleanmode)", without the wake-up word, and the controller 190 may control such that the processing results of the spoken sentences (the air conditioner being turned on and driven in clean mode) are outputted.

Figure 6:
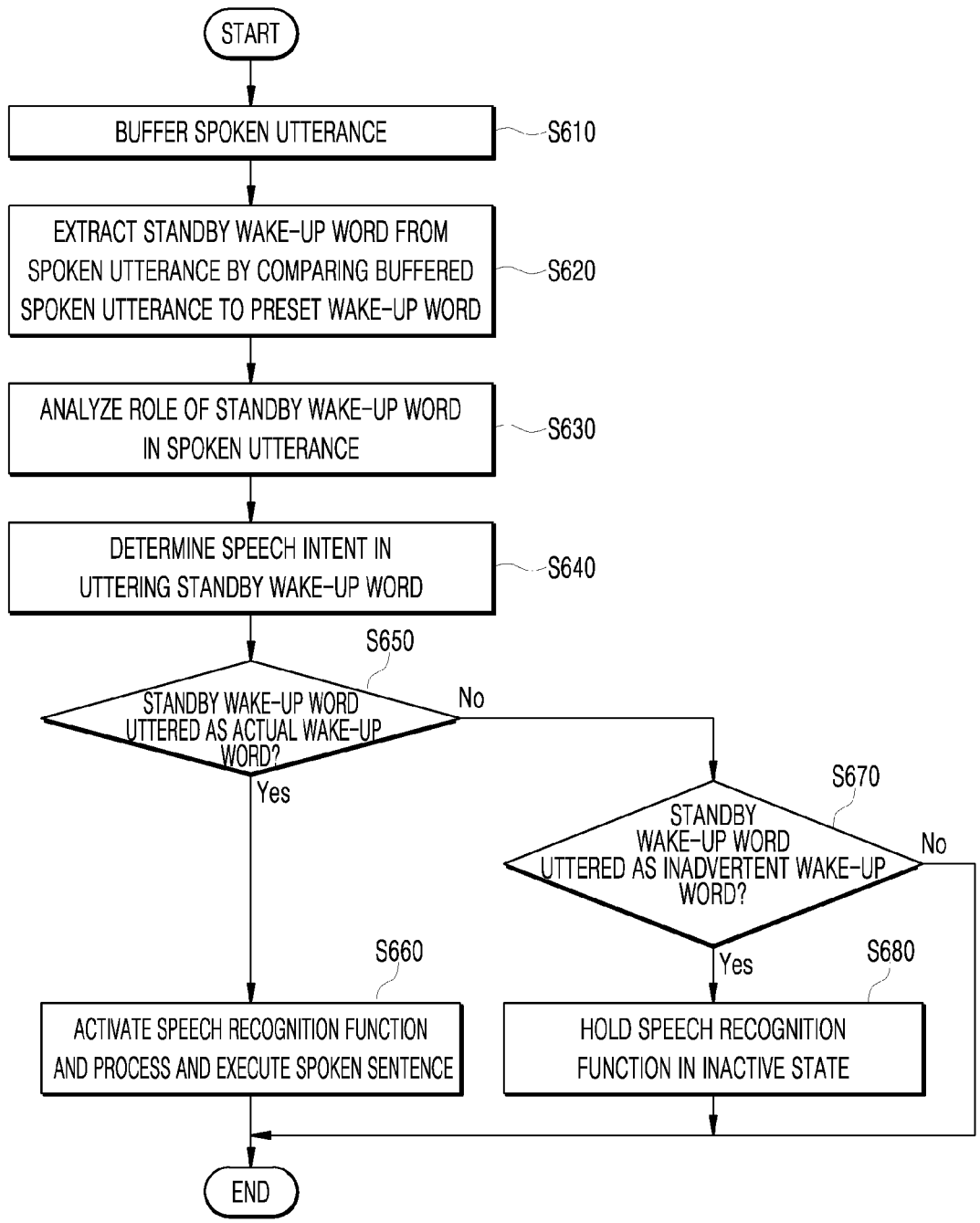
FIG. 6 is a flowchart of a speech recognition process according to an embodiment of the present disclosure.

FIG. 6 is a flowchart of a speech recognition process according to an embodiment of the present disclosure. In the following description, a repetitive description of the parts previously described with reference to FIG. 1 through FIG. 5 will be omitted.

Referring to FIG. 6, in step S610, the speech recognition device 100 buffers a spoken utterance. Here, the spoken utterance may be a spoken utterance not containing a pause. In addition, the step S610 may further include converting the buffered spoken utterance to text. Hereinbelow, the term "spoken utterance" may be interpreted as having a similar meaning as the converted text of the spoken utterance or including the converted text of said spoken utterance.

In step S620, the speech recognition device 100 compares the spoken utterance to a preset wake-up word, and extracts, from the converted text of the spoken utterance, a standby wake-up word which corresponds to or contains the preset wake-up word.

In step S630, the speech recognition device 100 analyzes the role of the standby wake-up word, based on named-entity recognition (NER) and/or natural language processing (NLP) which performs at least one from among morphological segmentation, part-of-speech tagging, sentence breaking, and parsing, on the spoken utterance. More specifically, through natural language processing and/or named-entity recognition of the converted text of the spoken utterance, the speech recognition device 100 may analyze whether the standby wake-up word is associated with a calling particle, such as "A/ya/(i)yeo/(i)siyeo", and is thus uttered vocatively, or whether the standby wake-up word is uttered vocatively without being associated with a calling particle. In some embodiments, through natural language processing and/or named-entity recognition of the converted text of the spoken utterance, the speech recognition device 100 may analyze the sentence type of a spoken utterance by referring to a relation between one or more words contained in the spoken sentence that may or may not contain the standby wake-up word. Examples of the sentence type include a declarative sentence, an interrogative sentence, an imperative sentence, an exclamatory sentence, an optative sentence, and so forth.

In step S640, the speech recognition device 100 determines the speech intent in uttering the standby wake-up word by using the results of analyzing the role of the standby wake-up word. More specifically, determining the speech intent in uttering the standby wake-up word may include determining that the standby wake-up word is uttered as a deliberate wake-up word in a given spoken utterance, or may include determining that the standby wake-up word is uttered as an inadvertent wake-up word in a given spoken utterance. When the standby wake-up word is associated with a calling particle in the converted text of the spoken utterance, the speech recognition device 100 may determine that the speech intent in uttering the standby wake-up word is to utter a deliberate wake-up word. In some embodiments, even when the standby wake-up word is not associated with any calling particle within the converted text of the spoken utterance, if the standby wake-up word has a vocative meaning, the speech recognition device 100 may determine that the speech intent in uttering the standby wake-up word is to utter a deliberate wake-up word. In some embodiments, if the standby wake-up word is present, and the sentence type of the spoken sentence is an interrogative or imperative sentence, the speech recognition device 100 may determine that the speech intent in uttering the standby wake-up word is to utter a deliberate wake-up word. If the standby wake-up word is used as a sentence component (such as a subject, an object, etc.) in the converted text of the spoken utterance, or if the standby wake-up word is used in a spoken sentence whose sentence type is neither interrogative nor imperative, the speech recognition device 100 may determine that the speech intent in uttering the standby wake-up word is to utter an inadvertent wake-up word.

In steps S650 and S660, if it is determined that the standby wake-up has been uttered as a deliberate wake-up word, the speech recognition device 100 may activate the speech recognition function and execute the spoken sentence.

In steps S670 and S680, if it is determined that the standby wake-up word has been uttered as an inadvertent wake-up word, the speech recognition device 100 may keep the speech recognition function inactive.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. In addition, it should be understood that any numerical range recited herein is intended to include all sub-ranges subsumed therein (unless expressly indicated otherwise) and therefore, the disclosed numeral ranges include every individual value between the minimum and maximum values of the numeral ranges.

In addition, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. In addition, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A speech recognition method by a speech recognition device, the speech recognition method comprising:
buffering a spoken utterance;
extracting a standby wake-up word from the buffered spoken utterance by comparing the buffered spoken utterance to a preset wake-up word, the extracted standby wake-up word corresponding to the preset wake-up word;
analyzing a role of the extracted standby wake-up word in the buffered spoken utterance;
determining a speech intent in uttering the standby wake-up word in response to results of the analyzing the role of the extracted standby wake-up word such that the extracted standby wake-up word is determined as either a deliberate wake-up word or as an inadvertent wake-up word, the speech intent determined as utterance of the inadvertent wake-up word when the analyzed role of the extracted standby wake-up word is not a vocative case within the buffered spoken utterance, but is a sentence component including a subject or an object;
determining whether to execute a spoken sentence as a voice command included in the buffered spoken utterance, according to results of the determining the speech intent in uttering the standby wake-up word; and
processing the spoken sentence by:
activating a speech recognition function and executing the spoken sentence as the voice command in response to determining the extracted standby wake-up word as the deliberate wake-up word; and
not activating the speech recognition function in response to determining the extracted standby wake-up word as the inadvertent wake-up word.

2. The speech recognition method of claim 1, wherein the buffering includes buffering the spoken utterance containing a pause between the standby wake-up word and the spoken sentence, the pause being shorter than a preset duration.

3. The speech recognition method of claim 1, wherein the buffering further includes buffering the spoken utterance by varying a buffering volume or time in accordance with a condition under which the spoken utterance is inputted.

4. The speech recognition method of claim 1, wherein the analyzing includes analyzing the role of the standby wake-up word, based on named-entity recognition or natural-language processing of the spoken utterance, the natural-language processing including one or more selected from among morphological segmentation, part-of-speech tagging, sentence breaking, and parsing.

5. The speech recognition method of claim 1, further comprising, if the results of determining the speech intent in uttering the standby wake-up word indicate that the standby wake-up word is uttered as a deliberate wake-up word, isolating the spoken sentence without the deliberate wake-up word from the spoken utterance.

6. The speech recognition method of claim 5, wherein the isolating includes at least one selected from:
- isolating, from the spoken utterance, the spoken sentence preceding the deliberate wake-up word;
- isolating, from the spoken utterance, the spoken sentence following the deliberate wake-up word;
- isolating, from the spoken utterance, first and second spoken segments without the deliberate wake-up word positioned within the spoken sentence, the first spoken segment preceding the deliberate wake-up word and the second spoken segment following the deliberate wake-up word; and
- isolating, from the spoken utterance containing two or more spoken sentences, the two or more spoken sentences without the deliberate wake-up word positioned between the two or more spoken sentences.

7. A computer program, stored in a non-transitory recording medium readable by a computer for permitting the speech recognition method of claim 1 to be executed by the computer.

8. A speech recognition device configured to recognize an inputted spoken utterance, the speech recognition device comprising:
- a buffer configured to buffer the spoken utterance;
- an extractor configured to extract, from the buffered spoken utterance, a standby wake-up word corresponding to a preset wake-up word by comparing the buffered spoken utterance to the preset wake-up word;
- an analyzer configured to analyze a role of the extracted standby wake-up word within the buffered spoken utterance;
- a determiner configured to determine a speech intent in uttering the standby wake-up word in response to results of the analyzing the role of the extracted standby wake-up word such that the extracted standby wake-up word is determined as either a deliberate wake-up word or as an inadvertent wake-up word, the speech intent determined as utterance of the inadvertent wake-up word when the analyzed role of the extracted standby wake-up word is not a vocative case within the buffered spoken utterance, but is a sentence component including a subject or an object; and
- a controller configured to:
  - determine whether to execute a spoken sentence as a voice command included in the buffered spoken utterance, according to results of the determining the speech intent in uttering the standby wake-up word; and
  - process the spoken sentence by:
    - activating a speech recognition function and executing the spoken sentence as the voice command in response to determining the extracted standby wake-up word as the deliberate wake-up word; and
    - not activating the speech recognition function in response to determining the extracted standby wake-up word as the inadvertent wake-up word.

9. The speech recognition device of claim 8, wherein the buffer is configured to buffer the spoken utterance containing a pause between the standby wake-up word and the spoken sentence, the pause being shorter than a preset duration.

10. The speech recognition device of claim 8, further comprising a variator configured to vary a buffering volume or time of the buffer in accordance with a condition under which the spoken utterance is inputted.

11. The speech recognition device of claim 8, wherein the analyzer is configured to analyze the role of the standby wake-up word, based on named-entity recognition or natural language processing of the spoken utterance, wherein the natural language processing performs one or more selected from among morphological segmentation, part-of-speech tagging, sentence breaking, and parsing.

12. The speech recognition device of claim 8, further comprising an isolator, wherein, when the results of determining the speech intent in uttering the standby wake-up word indicate that the standby wake-up word is uttered as a deliberate wake-up word, the isolator is configured to isolate, from the spoken utterance, the spoken sentence without the deliberate wake-up word.

13. The speech recognition device of claim 12, wherein the isolator performs at least one selected from:
- isolating, from the spoken utterance, the spoken sentence preceding the deliberate wake-up word;
- isolating, from the spoken utterance, the spoken sentence following the deliberate wake-up word;
- isolating, from the spoken utterance, first and second spoken segments without the deliberate wake-up word, the first spoken segment preceding the deliberate wake-up word, the second spoken segment following the deliberate wake-up word, and the deliberate wake-up word being positioned between the first spoken segment and the second spoken segment; and
- from the spoken utterance including two or more spoken sentences, isolating the two or more spoken sentences without the deliberate wake-up word positioned between the two or more spoken sentences.

* * * * *